United States Patent
Marcuse

[11] 3,909,110
[45] Sept. 30, 1975

[54] REDUCTION OF DISPERSION IN A MULTIMODE FIBER WAVEGUIDE WITH CORE INDEX FLUCTUATIONS

[75] Inventor: Dietrich Marcuse, Lincroft, N.J.

[73] Assignee: Bell Telephone Laboratories, Incorporated, Murray Hill, N.J.

[22] Filed: Nov. 11, 1974

[21] Appl. No.: 522,435

[52] U.S. Cl. .................. 350/96 WG; 350/96 R
[51] Int. Cl.² ........................................ G02B 5/14
[58] Field of Search ........................ 350/96 WG

[56] References Cited
UNITED STATES PATENTS

| | | | |
|---|---|---|---|
| 3,666,348 | 5/1972 | Marcatili | 350/96 WG |
| 3,687,514 | 8/1972 | Miller | 350/96 WG |
| 3,831,038 | 8/1974 | Dabby et al. | 350/96 WG X |

OTHER PUBLICATIONS
Personick, "Bell System Technical Journal," March 1971 pp. 843–868.
Marcuse, "Bell System Technical Journal," July–Aug. 1972, pp. 1199–1232.

*Primary Examiner*—R. V. Rolinec
*Assistant Examiner*—Darwin R. Hostetter
*Attorney, Agent, or Firm*—Thomas C. O'Konski

[57] ABSTRACT

Step index, multimode fiber waveguides are designed according to the disclosed invention with intentional fluctuations of the refractive index of the fiber core, with the aim of reducing dispersion by deliberately enhancing mode coupling in the fiber and, at the same time, minimizing loss in the fiber due to coupling to radiation modes. It is shown that, to avoid radiation losses, conditions should be imposed not only on the axial ($z$) dependence of the core fluctuations, but also on the azimuthal ($\phi$) and radial ($r$) dependence of the core fluctuations. Specifically, a selection rule is imposed on the coupling in the fiber by providing the core index fluctuations with an azimuthal dependence governed by a function of the form $\cos p\phi$, where $p$ is an integer equal to or greater than one. Coupling for a mode of an azimuthal mode number $\nu$ is thereby limited by the selection rule $\Delta\nu = \pm p$. Additionally, by limiting the location of the index fluctuations to a region below a certain maximum radius $r_{max}$ in the core, coupling to modes with large azimuthal mode numbers $\nu$ is avoided, and power loss via coupling to radiation modes is held to a minimum.

5 Claims, 5 Drawing Figures

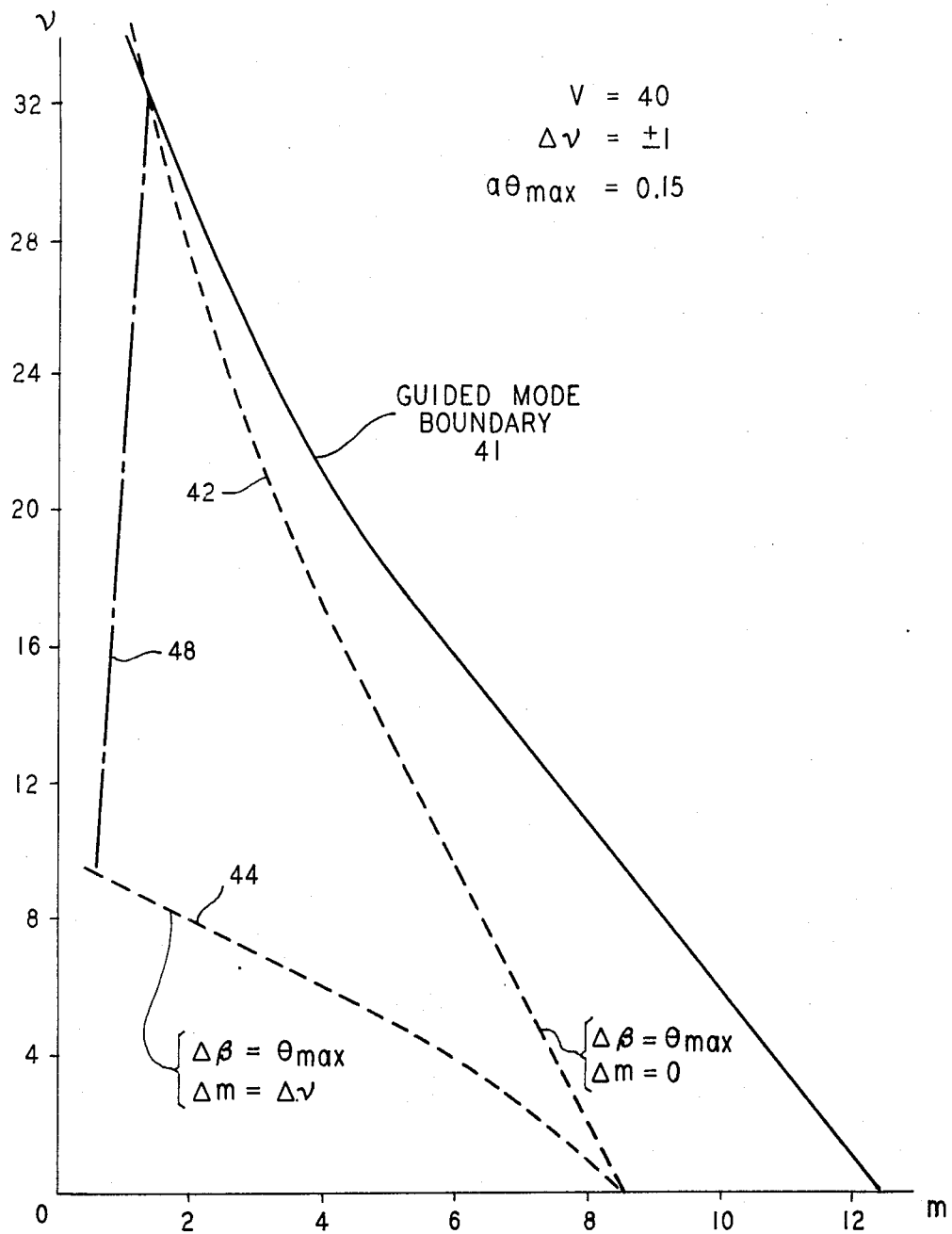

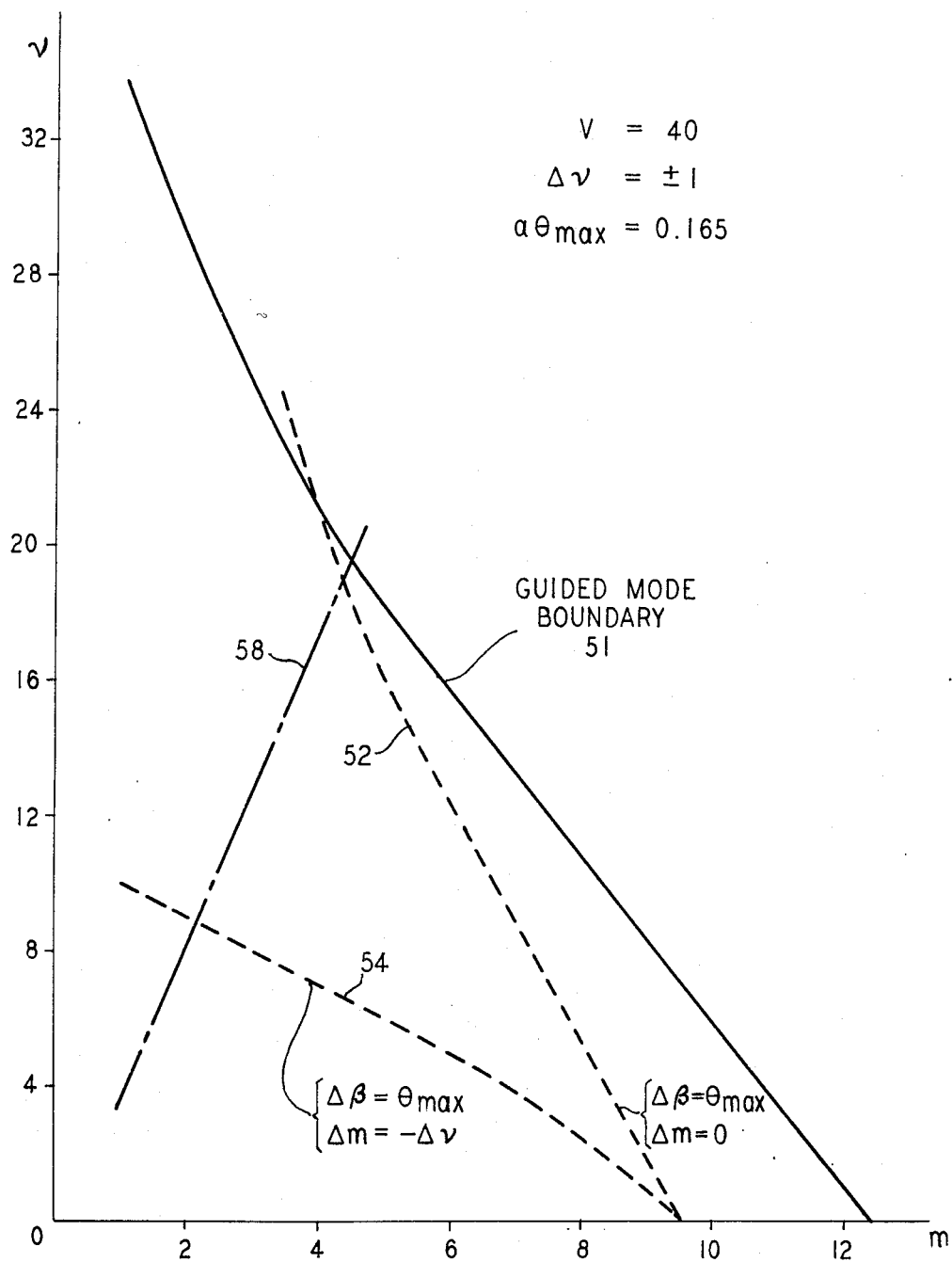

REDUCTION OF DISPERSION IN A MULTIMODE FIBER WAVEGUIDE WITH CORE INDEX FLUCTUATIONS

BACKGROUND OF THE INVENTION

This invention relates to optical fiber transmission media and, more particularly, to the reduction of dispersion in multimode optical fiber waveguides.

Optical fiber waveguides supporting many guided modes suffer from multimode dispersion. An optical pulse launched into a multimode fiber excites many modes, each traveling at a different group velocity. At the far end of the fiber, the pulse is spread out in time by an amount that is proportional to the length of the fiber because of the different group velocities of each mode. Such pulse dispersion can severely limit the information-carrying capacity of the fiber waveguide.

In the article by S. D. Personick published in Volume 50 of The Bell System Technical Journal, pages 840 through 868 (Mar. 1971), it is shown that multimode dispersion in fiber waveguides can be reduced by deliberately enhancing coupling among the various modes in the fiber. If the optical power carried in the fiber transfers back and forth between slow and fast modes, averaging takes place, so that the pulse no longer breaks up into a sequence of pulses, but is forced to travel at an average group delay, with a concomitant reduction in pulse spreading. Whereas the spread of pulse carried by uncoupled modes is proportional to the length of the fiber, it becomes only proportional to the square root of its length if the pulses are coupled among each other.

Unfortunately, reduction of multimode pulse dispersion by intentionally enhancing mode coupling in the fiber is typically bought at a price. Any of the known mechanisms that causes coupling among the guided modes in a fiber also tends to couple guided modes to the continuum of radiation modes. Power coupled into radiation modes radiates away from the fiber, causing losses. Although as suggested in the above-cited article by Personick, it is possible to carefully control the axial ($z$) dependence of the coupling mechanism to provide strong coupling among the guided modes in the fiber, and only weak coupling to the radiation modes, the radiation losses inherent in such a mechanism can still present a major problem, particularly in long distances fiber transmission media in which overall fiber losses must be kept to a minimum.

SUMMARY OF THE INVENTION

In accordance with the present invention, pulse dispersion in a multimode optical fiber waveguide is reduced by deliberately enhancing the mode coupling in the fiber in a way which minimizes coupling to radiation modes, and thus minimizes fiber losses.

The mode coupling mechanism of the present invention is achieved by providing the inner core of a step index, multimode fiber waveguide with refractive index fluctuations. It is shown that conditions should be imposed not only on the axial ($z$) dependence of the core fluctuations but also on the azimuthal ($\phi$) and radial ($r$) dependence of the core fluctuations to minimize radiation losses. In general, the coupling mechanism in the fiber must be able to couple all modes of as large a mode group as possible among each other without coupling to the modes of the continuous radiation spectrum. Coupling must therefore be limited to the modes inside of the area of guided modes in mode number space, while modes near the outer edge of this area should remain uncoupled to avoid radiation losses. This goal is achieved according to this invention by designing the coupling mechanism so that a definite selection rule for the couples modes is imposed. Specifically, the core index fluctuations are provided with an azimuthal dependence of the form $\cos p\phi$, where $p$ is an integer equal to or greater than one. This azimuthal index distribution insures that the coupling for a mode with an azimuthal mode number $\nu$ is limited by the selection rule $\Delta \nu = \pm p$. Once such a selection rule is imposed, it is possible to limit coupling modes inside an area of mode number space not including radiation modes by properly tailoring the axial ($z$) dependence of the core fluctuations.

Even with such a selection rule, the boundary delineating the area of coupling modes in the mode number space tends to cross into the area of radiation modes at large values of azimuthal mode number $\nu$. Thus, the additional danger exists that power outflow occurs to radiation modes via modes with large $\nu$ values. This remaining problem is avoided according to this invention by limiting the index fluctuations to a region inside the fiber core that remains below a certain maximum radius $r_{max}$. It is shown that, if the index fluctuations of the core do not extend beyond the radius $r_{max}$, coupling can be restricted to those modes in an area of mode number space completely within the area of guided modes.

BRIEF DESCRIPTION OF THE DRAWING

The various features and advantages of the invention will be better understood from the following detailed description taken in conjunction with the accompanying drawing in which:

FIGS. 4 and 5 are mode number space plots (azimuthal mode number $\nu$ versus radial mode number $m$) for an illustrative fiber waveguide of the type shown in FIG. 1 showing the regions of mode coupling induced in the fiber by core fluctuations designed in accordance with the invention.

DETAILED DESCRIPTION

1. General Design Considerations

Figure 1:
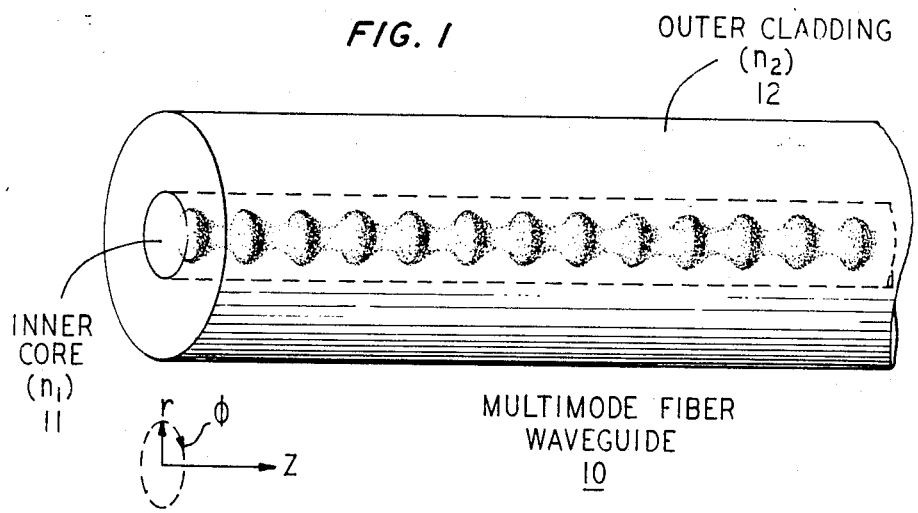
FIG. 1 shows a length of multimode, step index fiber waveguide including core index fluctuations designed in accordance with the invention.

FIG. 1 shows a segment of a step index, multimode optical fiber waveguide 10. Fiber 10 includes an inner core 11 of radius $a$ and of an unperturbed index of refraction $n_1$, surrounded by an outer cladding 12 of an index of refraction $n_2 < n_1$. Optical wave energy is assumed to propagate in fiber 10 along the $z$ axis of the illustrated cylindrical coordinate system, and to have a free space propagation constant $k = 2\pi/\lambda_0$, where $\lambda_0$ is the free space wavelength of the wave energy. The wave energy is essentially confined with core 11 by the dielectric discontinuity provided by the interface between core 11 and cladding 12.

To reduce dispersion in fiber 10, mode coupling is deliberately enhanced so that wave energy is exchanged among the plurality of different guided modes of the fiber. Mode coupling is achieved by providing the core of fiber 10 with refractive index fluctuations, illustrated by the relative shading of core 11 in FIG. 1. Generally, the regions of core 11 that are shaded more densely are intended to have relatively higher values of refractive index. As shown in FIG. 1, the refractive index of core 11 varies along the axial ($z$) direction, the azimuthal ($\phi$) direction, and the radial ($r$) direction of the illustrated coordinate system. The axial, azimuthal, and radial dependence of the core fluctuations are selected in accordance with the theory of the invention as set forth in section two of this detailed description, so that coupling occurs only among guided modes in the fiber, with coupling to radiation modes being avoided. Losses due to radiation from fiber 10 are consequently held to a minimum.

Specifically, in accordance with this invention, the coupling among the various modes in fiber 10 is restricted to those modes obeying the selection rule $\Delta\nu=\pm p$, where $p$ is an integer equal to or greater than one, and where $\Delta\nu$ is the difference in azimuthal mode number $\nu$ between any two modes that are coupled, by providing the index fluctuations core 11 with an azimuthal dependence of the form $\cos p\phi$. The coupling in the fiber is further restricted to those modes having $|\Delta m|$ less than a certain selected maximum value, where $\Delta m$ is the difference in radial mode number $m$ between any two modes that are coupled, by providing the index fluctuations in core 11 with an axial dependence of a spatially periodic form having a certain selected minimum spatial period $\Lambda_{min}$. The coupling in the fiber is still further restricted according to this invention to those modes having an azimuthal mode number $\nu$ less than or equal to a certain selected maximum value by limiting the index fluctuations to a region of core 11 below a radius $r_{max}$ which is less than $a$. The coupling in fiber 10 is thereby restricted completely to guided modes.

Section three of this detailed description summarizes two specific examples of optical fiber waveguides, like fiber 10 of FIG. 1, which are embodied in accordance with the principles of the invention. Section for of this description is directed to illustrative techniques for fabricating an optical fiber waveguide in accordance with the invention.

2. Theory

Figure 2:
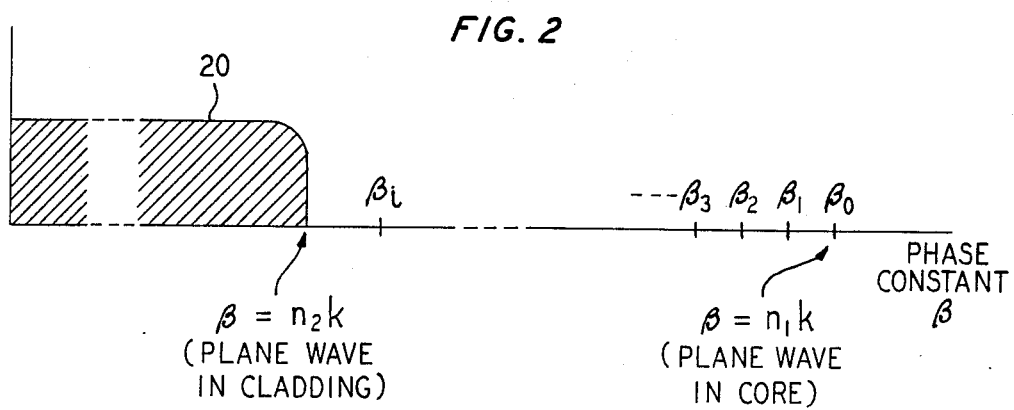
FIG. 2 illustrates the mode distribution as a function of phase constant for a multimode fiber waveguide of the type shown in FIG. 1.

FIG. 2 illustrates a typical mode distribution as a function of phase constant for a multimode fiber waveguide, such as fiber 10 of FIG. 1. In general, as seen in FIG. 2, there is a distribution of discrete guided modes starting at phase constant $\beta = n_1 k$ and decreasing in phase constant to $\beta_1, \beta_2, \ldots \beta_i$, respectively. There is, in addition, a continuum of radiation modes starting at phase constant $\beta = n_2 k$ that is less than the phase constants of the guided modes, as represented in the area bounded by curve 20.

The index fluctuations in core 11 are assumed to have an axial ($z$) dependence defined by the function $f(z)$. As shown in my article in Volume 51 of the Bell System Technical Journal, pages 1199-1232 (July-August 1972), if the function $f(z)$ is expanded in a Fourier series, two guided modes with phase constants $\beta_i$ and $\beta_j$ will be coupled by the Fourier component of spatial frequency $\theta$ given by $$\theta = \Delta\beta = \beta_i - \beta_j. \quad (1)$$

In order to couple among all guided modes $\Sigma$ fiber 10, a coupling function $f(z)$ must be provided whose Fourier spectrum has components at all these spatial frequencies that correspond to existing differences $\beta_i - \beta_j$ in fiber 10. It is not difficult to envision a coupling function $f(z)$ whose Fourier spectrum has a sufficient number of spatial frequencies to couple all modes among each other. For example, a suitable $f(z)$ may be formed by superimposing sine waves of random phase of the form $$f(z) = \sum_{i,j} \sin(\Omega_{ij} z + \Psi_{ij}) \quad (2)$$

where the sum $\Sigma$ is over all modes in the fiber, $\Psi_{ij}$ are random phase functions of the individual sine wave components, and $\Omega_{ij}$ are the spatial frequencies of the individual sine wave components and are given by $$\Omega_{ij} = \beta_i - \beta_j. \quad (3)$$

The Fourier spectrum of $f(z)$ is defined as $$F(\theta) = \lim_{L \to \infty} \frac{1}{\sqrt{L}} \int_0^L f(z) e^{-i\theta z} dz. \quad (4)$$

The spatial periodicity $\Lambda_{ij}$ of the individual sine wave components is simply $2\pi/\Omega_{ij}$.

The crucial question is whether or not it is possible to couple between guided modes in a fiber wave-guide, while avoiding coupling between guided modes and radiation modes. In order to determine whether this is in fact possible, the spacing in $\beta$ space between guided modes in the fiber waveguide must first be analyzed.

Figure 3:
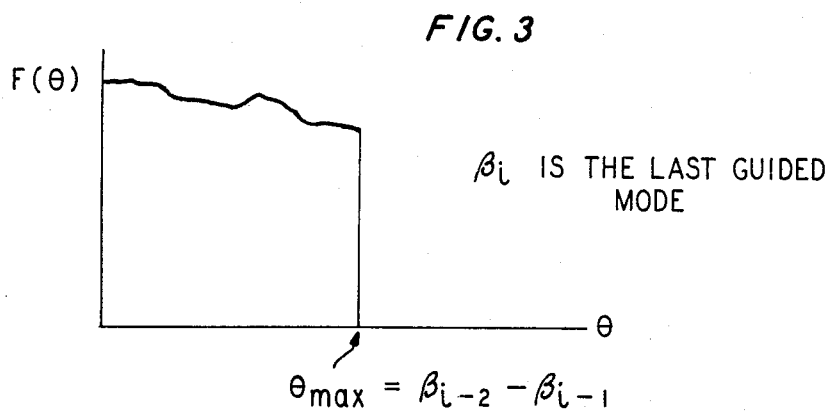
FIG. 3 is a schematic illustration of the Fourier spectrum $F(\theta)$ of the axial dependence $f(z)$ of the core indes fluctuations including a sharp cutoff $\theta_{max}$ in spatial frequency.

As shown in my above-cited Bell System Technical Journal article, selective coupling is made possible in a dielectric slab waveguide by the fact that the spacing between guided modes in $\beta$ space decreases monotonically with decreasing mode number. Selectively coupling in a slab waveguide is thus possible by selecting the Fourier spectrum $F(\theta)$ of the coupling function $f(z)$ as shown in FIG. 3. Specifically, by providing a sharp cut off $\theta_{max}$ to the Fourier spectrum (i.e., a minimum spatial period $\Lambda_{min}$ to the function $f(z)$), coupling can be provided among lower order modes of the slab waveguide, while the last guided mode $\beta_t$ remains uncoupled. The maximum spatial frequency $\theta_{max}$ is chosen to be equal to the separation in $\beta$ space between the $\beta_{t-2}$ mode and the $\beta_{t-1}$ mode. The exact shape of the Fourier spectrum below $\theta_{max}$ is uncritical as long as components exist at each of the spatial frequencies $\theta$ of interest.

Unfortunately, the behavior of the modes in a fiber waveguide contrasts with the behavior of the modes in a slab waveguide. When the phase constants for the guided modes in a fiber are calculated and listed in order of their numerical value, regardless of mode number, they appear to be approximately evenly spaced, as illustrated in FIG. 2. Because of this essentially equal spacing of the modes, simply shaping the Fourier spectrum of the coupling function $f(z)$ to have a sharp cut off $\theta_{max}$ is spatial frequency is not sufficient to avoid coupling to the radiation modes of the fiber.

An approximate expression for the spacing between guided modes in an optical fiber can be derived mathematically. As shown in my book entitled "Theory of Dielectric Optical Waveguides," Academic Press (1974) particularly Chapter 2 thereof, the transverse electric field components in a weakly guided fiber can be represented by $$E_\nu = AJ_\nu(kr)\cos\nu\phi e^{-i\beta z} \quad (5)$$

where $J(kr)$ is a Bessel function and $$= (n_1^2 k^2 - \beta^2)^{1/2} \quad (6)$$

To a good approximation, it may be assumed that $E_\nu$ equals zero at the core radius $r = a$. This approximation is better for modes far from their cut-off value but, in any event, gives a reasonable indication of the phase constants for practically all modes. Using the Debye approximation of the Bessel function $J_\nu(kr)$ in Equation (5), an approximate eigenvalue equation of the guided modes may thus be written $$[(ka)^2 - \nu^2]^{1/2} - \nu \arccos\left(\frac{\nu}{ka}\right) - \frac{\pi}{4} = (2m-1)\frac{\pi}{2} \quad (7)$$

for $m = 1, 2, 3 \ldots$. By regrouping Equation (7), a form of the equation is obtained that is useful for iterative solutions as follows $$ka = \left[\nu^2 + \left[\left(m - \frac{1}{4}\right)\pi + \nu \arccos\left(\frac{\nu}{ka}\right)\right]^2\right]^{1/2} \quad (8)$$

Combining Equations (6) and (7), the following expression is obtained $$\Delta\beta = -\frac{k^2}{\beta}\frac{\Delta\nu}{\nu} + \left[\frac{\pi\Delta m - \frac{\Delta\nu}{\nu}\left(m - \frac{1}{4}\right)\pi}{[(ka)^2 - \nu^2]^{1/2}}\right] \quad (9)$$

where $\Delta\beta$ is the spacing in $\beta$ space between modes that are separated by an amount $\Delta\nu$ of the azimuthal mode number $\nu$ and an amount $\Delta m$ of the radial mode number $m$.

It is noted from Equation (9) that the spacing $\Delta\beta$ between the guided modes in the fiber increases for larger volumes of $\Delta m$, while the behaviour of the spacing $\Delta\beta$ as a function of $\Delta\nu$ varies depending upon the particular values of the mode numbers $\nu$ and $m$. Thus, while it is possible to introduce a cutoff frequency $\theta_{max}$ into the Fourier spectrum of the $z$ dependence $f(z)$ of the core fluctuations so that modes with large values of $\Delta m$ remain uncoupled, it is impossible to do so for modes with large values of $\Delta\nu$. Consequently, in accordance with the principles of this invention, a definite selection rule is imposed on the allowed values of $\Delta\nu$. Specifically, by providing the core index fluctuations with an azimuthal ($\phi$) dependence defined by a function of the form $$p(\phi) = \cos p\phi \quad (10)$$

where $p$ is equal to $1, 2, \ldots$, coupling for a mode of azimuthal mode number $\nu$ is limited by the selection rule $$\Delta\nu = \pm p \quad (11)$$

Thus, for example with $p = 2$, the mode with azimuthal mode number $\nu$ can be coupled only to modes with azimuthal mode numbers $\nu+2$ and $\nu-2$, respectively.

It will be assumed for the purposes os simplicity in the following discussion that $p(\phi)$ is chosen so that a selection rule of the form $$\Delta\nu = \pm 1 \quad (12)$$

is imposed (i.e., $p \equiv 1$). Since, as indicated hereinabove, it is possible to introduce a cutoff frequency $\theta_{max}$ into a Fourier spectrum of $f(z)$ so that modes with large values of $\Delta m$ remain uncoupled, the discussion will be restricted, also for purposes of simplcity, to a limited range of values for $\Delta m$, and more particularly to $$\Delta m = 0 \text{ or } \pm 1. \quad (13)$$

For $\Delta m = 0$, Equation (9) can be written as $$|\Delta\beta| = \frac{k^2}{\nu\beta}\left|\frac{\left(m - \frac{1}{4}\right)\pi}{[(ka)^2 - \nu^2]^{1/2}} - 1\right| \text{ for } \begin{array}{l}\Delta m = 0 \\ \Delta\nu = \pm 1\end{array} \quad (14)$$

For $\Delta m = \pm 1$, Equation (9) can be written as $$|\Delta\beta| = \frac{k^2}{\nu\beta}\left|\frac{\left[\left(m - \frac{1}{4}\right) + \nu\right]\pi}{[(ka)^2 - \nu^2]^{1/2}} - 1\right| \text{ for } \begin{array}{l}\Delta m = \Delta\nu \\ \Delta\nu = \pm 1\end{array} \quad (15)$$

The case $\Delta m = \Delta\nu$ is not considered since it leads to larger spatial frequencies (smaller spatial periods) than those obtained in Equation 15.

FIGS. 4 and 5 of the drawing are mode number space plots (i.e., azimuthal mode number $\nu$ versus radial mode number $m$) which illustrate the behavior of the modes in an optical fiber waveguide. Both figures were drawn for an illustrative optical fiber, such as fiber 10 of FIG. 1, with $$V = (n_1{}^2 - n_2{}^2)^{1/2} ka = 40 \qquad (16)$$

and with $n_1 = $ b 1.515, $n_2 = 1.5$, so that $n_1/n_2 = 1.01$. Solid lines 41 and 51 in FIGS. 4 and 5, respectively, delineate the boundary of guided modes in mode number space. These lines are generated by plotting those values of the mode numbers $\nu$ and $m$ that result in $a = V$. All guided modes in the fiber are located to the left and below lines 41 and 51 in both figures, while radiation modes are located to the right and above lines 41 and 51. Broken lines 42 and 44 in FIG. 4 and 52 and 54 in FIG. 5, respectively, represent lines that delineate the boundary for mode coupling with a Fourier spectrum of $f(z)$ whose cutoff frequency is $\theta = \theta_{max}$. Broken lines 42, 44, 52 and 54 result from plotting the combination of $\nu$ and $m$ values that yield $\Delta \beta = \theta_{max}$. Line 42 in FIG. 4 and line 52 in FIG. 5, both labeled $\Delta m = 0$, were computed from Equation (14) above. Line 44 in FIG. 4 and line 54 in FIG. 5, both labeled $\Delta m = -\Delta \nu$ were obtained from Equation (15) above. Modes below and to the left of the broken lines 42, 44, 52 and 54 couple to their nearest neighbor via the selection rules $\Delta \nu = \pm 1$ and $\Delta m = 0$ or $\Delta m = -\Delta \nu$ Modes located to the right and above the broken lines cannot couple to each other since no spatial frequencies producing this coupling are available in the Fourier spectrum. FIGS. 4 and 5 differ only in the choice of the cut off frequency $\theta_{max}$ (i.e., $a\theta_{max} = 0.15$ for FIG. 4, while $a\theta_{max} = 0.165$ for FIG. 5). Dash-dotted lines 48 and 58 in FIGS. 4 and 5 will be explained below.

I should be noted that the modes located between lines 42 and 44 in FIG. 4 and between lines 52 and 54 in FIG. 5 can couple only to their nearest neighbors above and below in the mode number plane. However, since the modes with low $\nu$ values below line 44 in FIG. 4 and below line 54 in FIG. 5 are able to couple to their neighbors to the left and to the right, all modes below line 42 in FIG. 4 and below line 52 in FIG. 5 are actually coupled together.

It is apparent from FIGS. 4 and 5 that, with a selection rule of the form $\Delta \nu = \pm 1$, it is possible to provide coupling among most of the guided modes in the fiber by means of a Fourier spectrum of the type shown in FIG. 3, while modes to the right and above lines 42 and 52 remain uncoupled. In FIG. 4, only the mode with $m = 1, \nu = 34$, lying on the guided mode boundary 41, is coupled to radiation modes as well as to other guides modes. In FIG. 5, all modes with $m < 4, \nu > 21$ on the guided mode boundary 51 couple to radiation modes as well as to guided modes. Optical power is thus able to flow out of the guided mode region causing radiation losses via modes with large values of $\nu$. This power loss could be avoided in each case by decreasing $\theta_{max}$, as should be evident by comparing FIG. 4 with FIG. 5. Alternatively, as shown below, it is possible to prevent mode coupling for modes exceeding a certain maximum $\nu$ by properly choosing the radial ($r$) dependence of the core index fluctuations.

It is possible to derive an approximate rule for calculating the cut off frequency $\theta_{max}$ appearing in FIGS. 4 and 5. The maximum $\nu$ value on the guided mode boundary (lines 41 and 51, respectively) for which mode coupling should cease is first specified as $\nu_{max}$. As noted above, the radial design specification for achieving this value $\nu_{max}$ will be given below. The corresponding value of $m$ on or near the guided mode boundary is obtained from the cut off condition $a = V$ and Equation (8) as follows:

$$m_{max} = \frac{1}{4} - \frac{\nu_{max}}{\pi} \arccos\left(\frac{\nu_{max}}{V}\right) + \frac{1}{\pi}\left(V^2 - \nu_{max}{}^2\right)^{1/2} \qquad (17)$$

Substituting the values of $\nu_{max}$ and $m_{max}$ from Equation (17) into Equation (14) and using $\beta = n_2 k$, yields the desired value of $\Delta \beta = \theta_{max}$. For example, for $V = 40$ and $\nu_{max} = 20$, Equation (17) yields $m_{max} = 4.61$ and Equation (14) yields $a\theta_{max} = 0.17$, in good agreement with FIG. 5. Of course, it does not make physical sense to use a non-integer $m_{max}$, but it is advisable to use this value in Equation (14) in order to obtain a more accurate value of $\theta_{max}$. Incidentally, Equation (17) defines the guided mode boundary in FIGS. 4 and 5 if it is used for all possible values of $\nu = \nu_{max}$.

As is evident from FIGS. 4 and 5, and as noted earlier, it is desirable to avoid coupling among modes with large $\nu$ values to avoid radiation losses. It has been found that it is possible to avoid coupling among modes with large $\nu$ values by properly selecting the radial ($r$) dependence of the core fluctuations, defined by a function $g(r)$. It follows from the properties of Bessel functions that the field intensity of the transverse field components is extremely weak for radii that obey the relationship $$r < \nu. \qquad (18)$$

This result is easily interpreted in terms of ray optics. Modes with large values $\nu$ are represented by skew rays that spiral around the fiber axis. These rays avoid the vicinity of the fiber axis and stay nearer to the core boundary for larger values of $\nu$. The radius defined by $r = \nu$ represents the turning point below which a ray with a given value of $\nu$ does not penetrate. Consequently, by selecting $g(r)$ so that the index fluctuations do not extend beyond a radius $r_{max}$, it is possible to limit coupling to modes with $\nu$ values that remain below a maximum value near the mode boundary that is defined by $$\nu_{max} = V \frac{r_{max}}{a} \qquad (19)$$

where $a$ has been replaced by its maximum value V. The values $\nu_{max}$ and the corresponding values for $m_{max}$ and $\theta_{max}$ defined by Equations (18) and (14) determine the position at which broken lines 42 and 52 cross the guided mode boundaries 41 and 51, respectively, of FIGS. 4 and 5. Coupling of guided modes to radiation modes can be avoided by limiting the $\nu$ values of those modes that are coupled by the core index fluctuations. If the indes fluctuations do not extend beyond the radius $r_{max}$, coupling is restricted to those modes that remain below a boundary defined by $$\nu = kr_{max}. \quad (20)$$

Using Equation (8), a function $m = m(\nu)$ is obtained that defines the boundary in mode number space beyond which mode coupling ceases because the index fluctuations are restricted to radii $r \leq r_{max}$ af follows:

$$m(\nu) = \frac{1}{4} + \frac{\nu}{\pi}\left[\left(\frac{a^2}{r_{max}^2} - 1\right)^{1/2} - \arccos\frac{r_{max}}{a}\right]. \quad (21)$$

This boundary is shown in FIGS. 4 and 5 as dash-dotted lines 48 and 58, respectively. Knowing $\nu_{max}$, $r_{max}$ can be calculated from Equation (19) Illustratively, $r_{max}/a = 0.8$ in FIG. 4, while $r_{max}/a = 0.5$ in FIG. 5. A mechanism is thus now provided for coupling all modes that remain inside the nearly triangular areas defined by lines 42, 48 and the $m$ axis in FIG. 4, and by lines 52, 58 and the $m$ axis in FIG. 5. Coupling to radiation modes is thus avoided.

Mode coupling in multimode dielectric optical waveguides is most conveniently described by a coupled mode theory. As shown in my above-cited book entitles Theory of Dieelectric Optical Waveguides, particularly in Chapter 5 thereof, the power coupling coefficients are defined as follows:

$$h_{\nu n, \mu m} = \langle |K_{\nu n, \mu m}|^2 \rangle \quad (22)$$

where the symbol $\langle\rangle$ indicates an ensemble average. The coefficient $K_{\nu n, \mu m}$ stems from the coupled amplitude equation and is defined by $$K_{\nu n, \mu m} = \frac{\omega\epsilon_o}{4iP}\int_0^{2\pi} d\phi \int_0^{\infty} rdr(n^2-n_o^2)\vec{E}_{\nu n}^* \cdot \vec{E}_{\mu m} \quad (23)$$

where $\omega$ is the angular frequency of the wave energy in the waveguide, $\epsilon_o$ is the free space dielectric premittivity, P designates the power normalization constant of the modes with electric field vectors $\vec{E}_{\nu n}$ and $\vec{E}_{\mu m}$, and $n_o$ is the index distribution of a perfect guide from which the actual guide deviates only slightly ($n_o = n_1$ for $r \leq a$, $n_o = n_2$ for $r \geq a$). The interest is in selecting the index fluctuation defined by $n$ so that the above-described conditions are imposed on the mode coupling in the fiber. For small differences $n-n_1$ (in which case $n^2-n_1^2 \approx n_1(n-n_1)$), the refractive index distribution of the core may be represented by the following general form $$n-n_1 = \Delta n f(z)p(\phi)g(r) \quad (24)$$

where $\Delta n$ is the maximum difference in index $(n-n_1)$ between any two points along $z$ in the core and $f(z)$, $p(\phi)$ and $g(r)$ define the axial, azimuthal and radial dependence of the core index fluctuations. As pointed out above, $f(z)$ is selected so that its Fourier spectrum $F(\theta)$ has a sharp cutoff $\theta_{max}$ as shown in FIG. 3 and is illustratively given by a function of the form of Equation (2). The sharp cutoff $\theta_{max}$ provided by $f(z)$ assures that the coupling in the fiber is restricted between modes with $|\Delta m|$ less than a certain maximum value. The function $p(\phi)$ is selected so that it imposes a definite selection rule on the allowed values of $\Delta \nu$, and is illustratively of the form given by Equation (10). The function $g(r)$ is selected so that the index fluctuations do not extend beyond a certain maximum radius $r_{max}$, and assures that the coupling is restricted to modes with $\nu$ values less than a certain $\nu_{max}$. Of the many possible choices for the function $g(r)$, two examples are given. For the case in which the index fluctuations are limited to a narrow area of the core below $r_{max}$, $g(r)$ may be given by Equation (25)

$$g(r) = W\delta(r-r_{max}) \quad (25)$$

where W is the narrow width of the index fluctuations and $\delta$ is the Dirac delta function. For the case in which the index fluctuations are limited to a wide area of the core defined by $0 < r < r_{max}$, $g(r)$ may be given by $$g(r) = \begin{cases} 1 & \text{for } r < r_{max} \\ 0 & \text{for } r > r_{max} \end{cases} \quad (26)$$

Expressions for the power coupling coefficients for each of the modes in the fiber can be obtained for each form of $g(r)$ by substituting the expression for the transverse field vectors given by Equation (5) into Equation (23) and solving for $\langle |K_{\nu n, \mu m}|^2 \rangle$ in accordance with Equation (22).

3. Examples

It is useful at this point to summarize briefly the specific examples mentioned throughout the foregoing section on theory and illustrated by the mode number space plots of FIGS. 4 and 5.

Both FIGS. 4 and 5 apply to a multimode fiber waveguide of the type shown in FIG. 1 including an inner core of radius $a$ and of unperturbed inded $n_1$ surrounded by an outer cladding of the index $n_2 < n_1$. The fiber illustratively has a V value (given by Equation (16)) equal to 40, with $n_1 = 1.515$, $n_2 = 1.5$, so that $n_1/n_2 = 1.01$.

Index fluctuations are provided in the fiber core to reduce multimode dispersion by enhancing coupling among selected guided modes in the fiber while avoiding coupling to radiation modes. The coupling among the modes is illustratively restricted to those modes obeying the rule $\Delta \nu = \pm 1$ by selecting the azimuthal dependence of the core index fluctuations to be of the form $\cos \phi$ (see Equations (10) and (11)). The coupling is further illustratively restricted to those modes obeying the rule $\Delta m = 0$ or $\Delta m = \pm 1$ by selecting the axial dependence of the index fluctuations to have a maximum Fourier component $\theta_{max}$. $\theta_{max}$ is determined from Equation (12) ($\theta_{max} = \Delta \beta$) by substituting therein the values $\nu_{max}$ and $m_{max}$, where $\nu_{max}$ specifies the azimuthal mode number of the highest order guided mode, (i.e., highest in $\nu$) that is to be coupled, and where $m_{max}$ specifies the radial mode number of that mode and is determined from Equation (17). The coupling is still further restricted to modes with $\nu \leq \nu_{max}$ by limiting the index fluctuations to a region of the fiber core below $r = r_{max}$, where $r_{max}$ is determined from Equation (19).

For the case covered by FIG. 4, $\nu_{max} = 32$, $m_{max} = 1.33$, $\theta_{max} = 0.15/a$ and $r_{max} = 0.8a$. For the case covered by FIG. 5, $\nu_{max} = 20$, $m_{max} = 4.61$, $\theta_{max} = 0.165/a$ and $r_{max} = 0.5a$. If it is assumed that $a = 50$ μm, which is a typical value, $\theta_{max} = 3000$ $m^{-1}$ and $r_{max} = 40$ μm for the case of FIG. 4, while $\theta_{max} = 3300$ $m^{-1}$ and $r_{max} = 25$ μm for the case of FIG. 5. The shortest spatial period $\Lambda_{min}$ appearing $f(z)$ ($\Lambda_{min} = 2\theta_{max}$) is thus 0.21 cm for the case of FIG. 4 and 0.19 cm for the case of FIG. 5.

4. Fabrication

A variety of techniques may be recognized by those skilled in the art as suitable for fabricating optical fiber structures including core index fluctuations shaped in accordance with the foregoing design considerations. For example, if the refractive index increase of the core material is achieved by a doping process, it should be possible to program the doping procedure to result in the desired index fluctuations. As noted in my above-cited article in the Bell System Technical Journal, a Fourier spectrum $F(\theta)$ with a sharp cutoff $\theta_{max}$ of the type shown in FIG. 3 can be generated by passing electrical noise through a low-pass filter. This filtered signal could then be used to control the doping procedure to provide the desired $f(z)$ dependence to the core fluctuations. Alternatively, as noted above, the desired Fourier spectrum can be generated by superimposing a number of sinusoidal electrical signals of random phase. To ensure that the Fourier spectrum has a sufficiently steep slope at its cutoff point, it is preferred that a relatively large number of sinusoidal components (e.g., of the order of 100) be employed. A single sinusoidal electrical signal could be employed to control the doping procedure to provide the desired $p(\phi)$ dependence to the core fluctuations.

As an alternative, a modified version of the fiber fabrication technique described in U.S. Pat. No. 3,823,995 issued to L. L. Carpenter on July 16, 1974 can be employed. In this technique, a fiber preform assembly is formed by applying a plurality of layers of material to a cylindrical mandrel by means of flame hydrolysis. A gas-vapor mixture is hydrolyzed within the flame of a burner to form a glass soot that leaves the flame in a stream which is directed toward and deposited on the mandrel. In the technique as conventionally employed, the mandrel is rotated and translated to provide a uniform deposition of the soot. Changing the gas-vapor mixture within the flame changes the composition, and thus refractive index, of the deposited layer. The mandrel is removed and the preform assembly so formed is heated, collapsed and drawn to reduce its cross-sectional area to form a fiber having the desired index distribution.

To produce fibers of the form of the present invention, the rotation and translation of the mandrel and/or the gas-vapor mixture would be controlled, not to produce uniform deposited layers, but layers which vary in composition according to the above-specified design considerations. The gas-vapor mixture, for example, would be controlled at predetermined rates synthesized as filtered electrical noise signals or as the superposition of sine wave components for the desired axial dependence, and as a single sine wave for the desired azimuthal dependence of the core fluctuations. Once the desired relative thickness $$\frac{r_{max}}{a}$$

is deposited, the remaining layers would be uniformly deposited. Of course, when the fiber preform is treated in this way, it is necessay to compress the periods of the sine waves in such a way that the desired spatial periods result in the fiber after the fiber is drawn from the preform.

What is claimed is:

1. An optical fiber waveguide capable of guiding optical wave energy in a plurality of different modes of wave propagation having different group velocities and of dissipating wave energy in the form of radiation modes, said fiber including an inner core of radius $a$ and of an unperturbed refractive index $n_1$ surrounded by an outer cladding of refractive index $n_2$ less then $n_1$, said fiber further including means for minimizing dispersion due to said difference in group velocities comprising means for enhancing coupling among said guided modes in said fiber while minimizing coupling among said guided modes and said radiation modes, said fiber being characterized in that said means comprises spatial fluctuations in the refractive index of said inner core, said core index fluctuating in value periodically along the longitudinal axis of said fiber and in an azimuthal direction about said longitudinal axis.

2. The optical fiber waveguide of claim 1 in which said core index fluctuations are limited to a region of said inner core below a maximum radius $r_{max}$ less than $a$.

3. The optical fiber waveguide of claim 1 in which said core index fluctuations have an azimuthal dependence of the form $$\cos p\phi$$

where $\phi$ specifies the azimuthal position in said fiber and $p$ is an integer equal to or greater than one, whereby the coupling in said fiber for a guided mode with an azimuthal mode number $\nu$ is limited by the selection rule $$\Delta \nu = \pm p$$

where $\Delta \nu$ is the difference in azimuthal mode number between any two guided modes that are coupled.

4. The optical fiber waveguide of claim 2 in which $r_{max}$ is given by $$r_{max} = \frac{\nu_{max}}{V} a$$

where $\nu_{max}$ is the highest azimuthal mode number of said guided modes that are coupled in said fiber and where $V$ is given by $$V = (n_1^2 - n_2^2)^{1/2} ka$$

where $k$ is the free space propagation constant of said wave energy.

5. An optical fiber waveguide capable of guiding optical wave energy in a plurality of different modes of wave propagation having different group velocities and of dissipating wave energy in the form of radiation modes, said fiber including an inner core of radius $a$ and of an unperturbed refractive index $n_1$ surrounded by an outer cladding of refractive index $n_2$ less than $n_1$, said fiber further including means for minimizing disperson due to said difference in group velocities comprising means for enhancing coupling among said guided modes in said fiber while minimizing coupling among said guided modes and said radiation modes, said fiber being characterized in that said means comprises spatial fluctuations in the refractive index $n$ of said inner core given by $$n - n_1 = \Delta n f(z) p(\phi) g(r)$$

where $\Delta n$ is the maximum difference in index $(n-n_1)$ between any two points along the longitudinal axis of said core, $f(z)$ defines the axial dependence of said index fluctuations and is given by the superposition of sine waves whose spatial periods are equal to or greater than a minimum spatial period $\Lambda_{min}$, $p(\phi)$ defines the azimuthal dependence of said index fluctuations and is given by $$\cos p\phi$$

where $\phi$ specifies the azimuthal position in said core and $p$ is an integer equal to or greater than one, and $g(r)$ defines the radial dependence of said index fluctuation and is given by $$g(r) = \begin{cases} 1 \text{ for } r \leq r_{max} \\ 0 \text{ for } r > r_{max} \end{cases}$$

where $r$ specifies the radial position in said core and $r_{max}$ is leas than $a$.

* * * * *